F. EICHBERG.
SINGLE PHASE MOTOR.
APPLICATION FILED MAY 22, 1908.
920,040.
Patented Apr. 27, 1909.
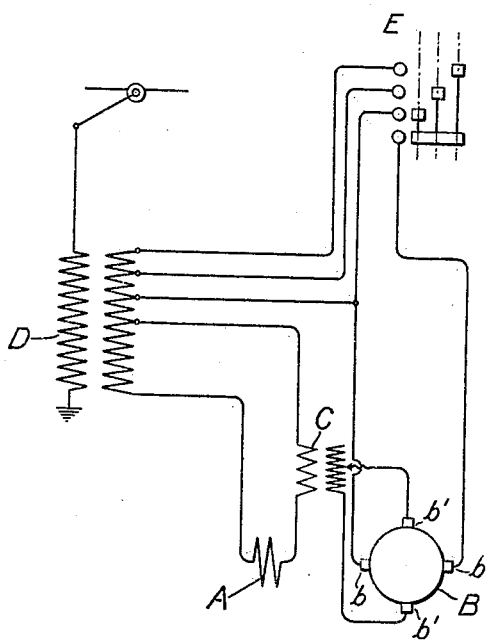
Witnesses:
George W. Tilden
J. Ellis Glen
Inventor:
Friedrich Eichberg,
by Albert G. Davis
Att'y.

UNITED STATES PATENT OFFICE.

FRIEDRICH EICHBERG, OF BERLIN, GERMANY, ASSIGNOR TO GENERAL ELECTRIC COMPANY, A CORPORATION OF NEW YORK.

SINGLE-PHASE MOTOR.

No. 920,040.  Specification of Letters Patent.  Patented April 27, 1909.

Application filed May 22, 1908. Serial No. 434,244.

*To all whom it may concern:*

Be it known that I, FRIEDRICH EICHBERG, a subject of the Emperor of Austria-Hungary, residing at Berlin, Germany, have invented certain new and useful Improvements in Single-Phase Motors, of which the following is a specification.

My invention relates to single-phase motors of the commutator type, and specifically to the type of motor described in prior applications filed by G. Winter and myself, comprising an inducing winding on the stator, an armature winding provided with a commutator, main brushes short-circuiting the armature on the line of magnetization of the inducing winding and exciting brushes and connections for producing a magnetization of the rotor at an angle to said line. We disclosed in said earlier applications a speed control system consisting in including in the short-circuit of the main brushes a shunt voltage opposing the voltage induced in the short-circuit by the inducing winding.

My present invention also consists in including a shunt voltage in the short-circuit of the main brushes, but its purpose is not for speed regulation, but for improving commutation; and the phase of the shunt voltage, with respect to voltage induced in the short-circuit by the inducing winding, is opposite to the phase of the voltage employed for speed control,—that is, instead of opposing the electromotive force induced in the short-circuit by the inducing winding, the shunt voltage in the present case assists it. The result is to reduce the strength of the inducing field. This field, for speeds below synchronism, is advantageous from the standpoint of commutation, since the electromotive force induced, by cutting it, in the coils short-circuited by the main brushes, opposes the electromotive force induced in those coils by the transformer action of the field set up by the current flowing through the exciting brushes; but above synchronism the effect of the inducing field becomes excessive. Consequently, my invention renders it possible to obtain better commutation under the main brushes at high speeds than is the case when the main brushes are short-circuited directly on themselves.

My invention will best be understood by reference to the accompanying drawing, which shows diagrammatically a single-phase motor arranged in accordance with my invention.

In the drawing, A represents the stator winding, and B the rotor winding, which is diagrammatically represented as provided with a commutator and two sets of brushes. One set of brushes $b$ $b$, when short-circuited, short-circuits the rotor on the line of magnetization of the inducing winding A. The other set $b'$ $b'$ is connected to supply the exciting current to the rotor, producing therein a magnetization displaced ninety electrical degrees from the line of magnetization of the stator winding. For this purpose, the exciting brushes $b'$ $b'$ are connected to the secondary of a variable ratio transformer C, the primary of which is connected in series with the inducing winding A. The inducing winding is shown supplied from the secondary of a transformer D. The connections, as thus far described, are the same as those disclosed in prior applications.

E represents a controlling switch, which has its contacts included in the circuit of the main brushes $b$ $b$. This switch, which is shown diagrammatically, with its contacts developed in a plane surface, has a number of positions indicated by the dotted lines. In its first position, the brushes $b$ $b$ are connected directly together. This is the position of the switch E for motor speeds up to synchronism. When the speed of the motor passes above synchronism, the switch E is moved to its other positions, in which variable portions of the secondary winding of transformer D are included in the circuit of the brushes $b$ $b$. This secondary winding of transformer D serves as a source of shunt voltage, and the movement of switch E through its positions introduces into the short-circuit of the main brushes a gradually increasing shunt voltage, which, as has been explained above, improves the commutation of the motor at high speeds.

I have described in prior patents and applications a number of modifications of the connections of a motor of this type. It will be understood that my invention is applicable to all these modifications, and is not confined to the particular connections shown in the drawings.

What I claim as new and desire to secure by Letters Patent of the United States, is,—

1. In a single-phase motor, an inducing winding on the stator, a rotor winding provided with a commutator, main brushes and connections arranged to short-circuit the rotor winding on the line of magnetization of the inducing winding, exciting brushes and connections arranged to produce a magnetization of the rotor at an angle to said line, and means for introducing into the circuit of the main brushes a shunt voltage assisting the voltage induced therein by said inducing winding.

2. In a single-phase motor, an inducing winding on the stator, a rotor winding provided with a commutator, main brushes and connections arranged to short-circuit the rotor winding on the line of magnetization of the inducing winding, exciting brushes and connections arranged to produce a magnetization of the rotor at an angle to said line, a source of shunt voltage, and means for including in the short-circuit of the main brushes said source so connected as to assist the voltage induced in said short-circuit by said inducing winding.

3. In a single-phase motor, an inducing winding on the stator, a rotor winding provided with a commutator, main brushes and connections arranged to short-circuit the rotor winding on the line of magnetization of the inducing winding, exciting brushes and connections arranged to produce a magnetization of the rotor at an angle to said line, and means for introducing into said short-circuit a gradually increasing shunt voltage assisting the voltage induced therein by the inducing winding.

4. In a single-phase motor, an inducing winding on the stator, a rotor winding provided with a commutator, main brushes and connections arranged to short-circuit the rotor winding on the line of magnetization of the inducing winding, exciting brushes and connections arranged to produce a magnetization of the rotor at an angle to said line, a winding forming a source of shunt voltage, and means for including in the short-circuit of the main brushes variable portions of said winding so connected as to assist the voltage induced therein by the inducing winding.

5. In a single-phase motor, an inducing winding on the stator, a rotor winding provided with a commutator, main brushes and connections arranged to short-circuit the rotor winding on the line of magnetization of the inducing winding, exciting brushes and connections arranged to produce a magnetization of the rotor at an angle to said line, a source of shunt voltage, and a switch having its contacts included in the circuit of the main brushes and arranged in one position to short-circuit said main brushes directly and in a subsequent position to include in said short-circuit said source so connected as to assist the voltage induced in said short-circuit by said inducing winding.

In witness whereof, I have hereunto set my hand this fourth day of May, 1908.

FRIEDRICH EICHBERG.

Witnesses:
JOHANN ALEXANDER,
AUGUST ELFET.